United States Patent [19]

Schlanger

[11] Patent Number: 4,741,548
[45] Date of Patent: May 3, 1988

[54] BICYCLE CHAIN HANGER

[75] Inventor: Raphael Schlanger, New Rochelle, N.Y.

[73] Assignee: Cannondale Corporation, Georgetown, Conn.

[21] Appl. No.: 9,957

[22] Filed: Feb. 2, 1987

[51] Int. Cl.⁴ .............................................. B62H 13/00
[52] U.S. Cl. ................... 280/289 R; 411/41; 474/273
[58] Field of Search .............. 280/289 R; 411/41, 60, 411/400; 24/297; 474/140, 273

[56] References Cited

U.S. PATENT DOCUMENTS

| | | | |
|---|---|---|---|
| 3,078,064 | 2/1963 | Turnbull | 411/41 |
| 3,232,161 | 2/1966 | Fernberg | 411/41 |
| 3,513,509 | 5/1970 | Gross | 411/41 |
| 4,509,767 | 4/1985 | Brilando | 280/289 R |

Primary Examiner—John J. Love
Assistant Examiner—Donn McGiehan
Attorney, Agent, or Firm—Brumbaugh, Graves, Donohue & Raymond

[57] ABSTRACT

A bicycle chain hanger comprises a unitary member molded from a polymeric material and including a disc-like base portion having a concavely curved internal surface adapted to bear against the wall of the seat stay and a generally L-shaped hook portion extending outwardly from the base portion and adapted to accept and hold an element of the chain in hooked relation. Two pins, driven with a force fit through each of two holes and through corresponding split sleeves that extend through holes in the seat stay tube into the space within the tube walls, deflect portions of the split sleeve out into interfering relation with the walls and edges of the tube holes and thereby retain the member on the seat stay.

4 Claims, 1 Drawing Sheet

BICYCLE CHAIN HANGER

BACKGROUND OF THE INVENTION

The present invention relates to a bicycle chain hanger for maintaining tension in the drive chain when the rear wheel is removed from the bicycle. It is installed on the inside of the right seat stay about six inches up from the center of the axle slot in the rear wheel dropout. The chain is hooked over the hanger while the rear wheel is still in place. When the rear wheel is removed, the spring-loaded, lever-mounted idler wheel of the rear derailleur maintains tension on the chain, keeping it trained around the drive sprocket and the derailleur and preventing it from drooping when the bicycle is placed on a carrier rack, locked up to a post or otherwise stored or handled.

Bicycle chain hangers are known per se and are often provided on bicycles with steel frame tubes by brazing a stubby nail-like member to the seat stay. In bicycles with aluminum frames, brazing is very complex and difficult and is impracticable. Aluminum welding is not as difficult as brazing but is time consuming and results in undesirably large fillets. Furthermore, when a frame (either steel or aluminum) with a hanger already installed is painted, the hanger creates a "shadow" in the paint spray pattern, which makes it difficult to get a good paint finish in the region of the hanger.

In the aluminum frames of "Cannondale" bicycles produced by the assignee of the present invention, Cannondale Corporation, chain hangers have, previously to the present invention, been provided by installing a special nut, called a "Rivnut", in the tube wall and threading a custom-made cap screw with a shoulder at the juncture between a threaded tip and plain shank to keep it in the correct position in the nut. This arrangement is costly, and if the hanger should be bent or dislodged it is not easily replaced, a disadvantage which it shares with the brazed hangers on steel frames.

SUMMARY OF THE INVENTION

The present invention is a chain hanger that is inexpensive to make, easy to install, is installed after the frame is painted and is easy to replace if it should be broken or dislodged. It is, in particular, a unitary member molded from a polymeric material. It concludes a disc-like base portion having a concavely curved internal surface adapted to bear against the wall of the seat stay. A hole extends through the base portion, and a split sleeve portion surrounds the hole, extends from the internal surface of the base portion and is receivable through a hole in the seat stay wall such that it projects into the space within the wall. A generally L-shaped hook portion extends outwardly from a portion of the external surface of the member and is adapted to accept and hold an element of the chain in hooked relation. A pin configured to be driven with a force fit through the hole and through the corresponding sleeve into the space within seat stay tube walls deflects portions of the split sleeve within the tube hole away from each other into interfering relation with the edges of the tube holes and thereby retains the member on the seat stay.

Preferred embodiment of the invention incorporate the following additional, through non-essential features:

(1) The pin is formed integrally with the unitary member and as formed is joined to the member by a thin band of the polymeric material along at least part of the circumference of the hole that receives it.

(2) The base portion has an opening that underlies part of the hook portion, whereby the member is adapted to be molded in a two-part mold having a boss that shapes the underside of the hook portion.

(3) The hook portion has a base leg part joined to the base portion of the member adjacent one of the holes and having a pair of tapered stiffening ribs, one disposed generally on either lateral side of that hole.

For a better understanding of the invention reference may be made to the following description of an exemplary embodiment, taken in conjunction with the accompanying drawings.

DESCRIPTION OF THE EMBODIMENT

Figure 4:
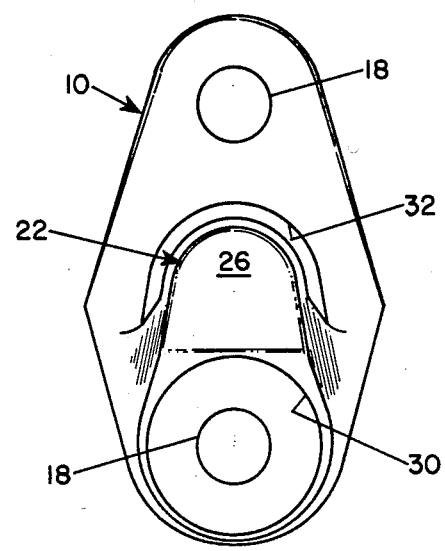
FIG. 4 is an elevational view of the side that faces inwardly, relative to the seat stay.

The chain hanger is injection-molded in one-piece from a rigid polymeric material, such as a high-impact grade of nylon. It comprises a disc-like base portion 10 that curves from front to back (i.e., transversely with respect to the seat stay tube axis) and has an outwardly facing surface 12 that is a segment of a circular cylindrical surface having a diameter equal to that of the outside diameter of the seat stay tube T of the bicycle frame. In side elevation the base portion 10 is widest a little below the center and tapers both upwardly and downwardly to rounded upper and lower ends (see FIGS. 4 and 5).

Circular-cylindrical split sleeves 14, one near the upper end and the other near the lower end, extend outwardly from the surface 12 of the base portion. Each sleeve is long enough to pass through a hole (not shown) in the seat stay tube T and extend a short distance beyond the inner surface of the tube wall. An axial hole 16, tapered along its distal portion, extends through the base portion 10 and axially through each split sleeve. As initially molded, the chain hanger has a pin 18 molded integrally at the outer opening of each hole 16, each pin being attached by a thin membrane 20 at the edge of the hole. After the chain hanger is applied to the tube T by passing the sleeves 14 into the tube holes and seating the surface 12 against the outer surface of the tube T, the pins 18 are driven into the holes until their outer ends are flush with the external surface of the base portion 10. The pins 18 are in the interference fit with the tapered parts of the sleeves and, therefore, expand the sleeves out tightly against the walls of the holes in the tube T and also expand the parts of the sleeves that extend in from the inner surface of the tube wall to a larger diameter than that of the receiving holes in the tube. This expansion of each sleeve 14 by the corresponding pin 18 strongly secures the chain hanger to the tube.

Figure 1:
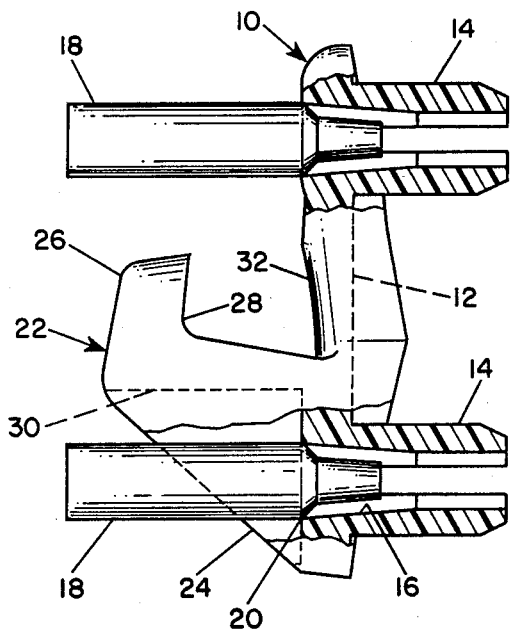
FIG. 1 is a rear elevational view of the embodiment i.e., the view is taken from the rear in the orientation of the chain hanger as installed on inside the right seat stay of the bicycle frame locking orthogonally to the seat stay tube axis-portions being broken away in cross-section and the seat stay tube being shown by phantom lines.
Figure 2:
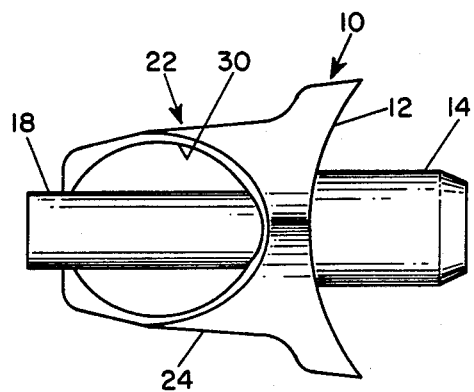
FIG. 2 is a bottom plan view.
Figure 3:
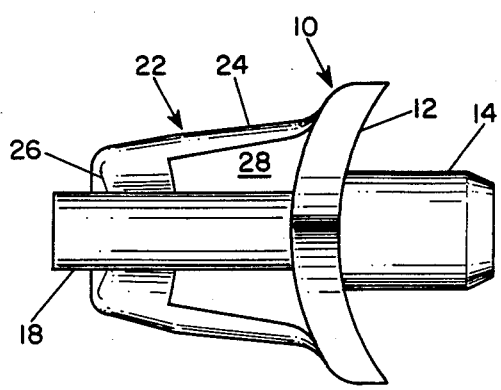
FIG. 3 is a top plan view.

The chain hanger has a hook portion 22 that extends inwardly from the lower part of the base portion 12. In front and rear elevations (see FIG. 1) the hook portion is generally L-shaped with an outwardly tapered and rounded base leg part 24 and an upwardly extending retaining leg part 26. The hook portion 22 is tilted upwardly and inwardly, relative to the tube, to form an upwardly facing capture space 28 for reception of a link element of the bicycle chain (not shown). The tilt of the hook holds the chain in against the base portion 10, thereby minimizing the bending load exerted by the tensioned chain on the hook portion 22.

In top and bottom plan (FIGS. 4 and 5) the base leg 24 of the hook portion 22 tapers slightly inwardly in a direction away from the base portion 10. In side elevation the internal aspect (FIG. 4) presents a round hole 30 coaxial with the lower pin 18 and extending into the leg part 18 of the hook to the level of the external surface of the base portion 10 (see FIG. 1). The hole defines in the lower front and rear regions of the vestigial leg part 24 of the hook a pair of tapered, gracefully curving ribs that impart stiffness and strength to the hook portion while permitting access to a tool for driving the lower pin 12 home.

Figure 5:
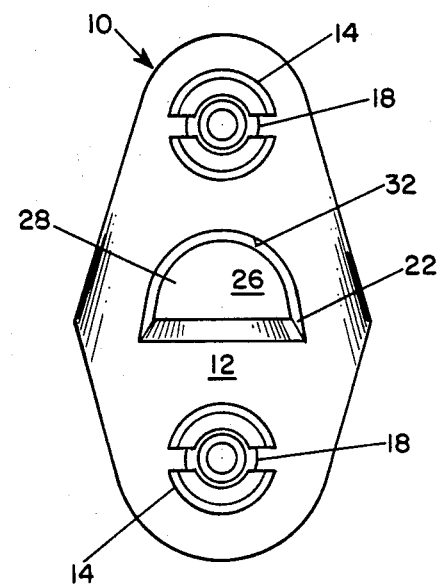
FIG. 5 is an elevational view of the side that faces outwardly (and thus bears against the seat stay).

As best seen in FIG. 5, a roughly semi-circular hole 32 extends through the base portion 10 of the chain hanger in underlying relation to the capture leg part 26 of the hook portion 22. The hole 32 is left by a boss of one part of the two-part mold that forms the capture space 28 of the hook portion but has no function in the use of the chain hanger.

As mentioned briefly above, the chain hanger has many advantages, such as a low cost of manufacture, ease of installation, avoidance of paint shadows (because it can be installed after the frame is painted), and ease of replacement. On the last point if the hanger should break or be partly dislodged, it can be replaced by simply pushing the pins 18 in through the sleeves, removing the hanger and installing a new one. In the preferred embodiment, in which the pins 18 are joined to the base, installation is simplified, because the pins are standing in place ready to be driven home. Likewise, the pins are not apt to be lost, and packaging replacement components is simplified by the one-piece construction. The hanger is small and compact—in the embodiment the location of the lower pin with the base leg part of the hook portion reduces the vertical extent of the hanger, as compared with a hook standing between pins, and yet the lower flanges at the sides of the pin access hole 30 provide good structural support for the hook portion.

I claim:

1. A chain hanger adapted to be attached to a seat stay of a bicycle frame about six inches along the seat stay from the axle dropout and to hold the bicycle drive chain trained around the rear derailleur and the drive sprocket when the rear wheel is detached from the frame comprising a unitary member molded from a polymeric material and including a disc-like base portion having a concavely curved internal surface adapted to bear aganist the wall of the seat stay and having an external surface, at least one hole through the base portion, a split sleeve portion surrounding each hole and extending from the internal surface of the base portion and adapted to extend through a hole in the seat stay wall and to project into the space within the wall, a hook portion including a base leg part extending outwardly from a portion of the external surface of the base portion and a hook leg part extending transversally from the base leg part and adapted to accept and hold an element of the chain in hooked relation, and a pin adapted to be driven with a force fit through each of the holes and through the corresponding split sleeve into the space within the tube walls and to deflect portions of the split sleeve within the tube hole away from each other into interfering relation with the walls and internal edges of the tube hole and thereby retain the member on the seat stay.

2. A chain hanger according to claim 1 wherein each of the pins is formed integrally with the unitary member and as formed is joined to the member by a severable thin membrane of the polymeric material along at least part of the circumference of the hole that receives it.

3. A chain hanger according to claim 1 wherein the base portion has an opening therethrough that underlies the by part of the hook portion, whereby the member is adapted to be molded in a two-part mold, one part of which has a boss that shapes said leg part of the hook portion.

4. A chain hanger according to claim 1 wherein the base leg part of the member is disposed adjacent one of the holes in the base portion and has a pair of tapered stiffening ribs, one disposed generally on each lateral side of said one hole, such that the base leg part partly straddles the hole.

* * * * *